(Model.)
H. S. SQUIER.
BRIDLE BIT.
No. 248,620.      Patented Oct. 25, 1881.
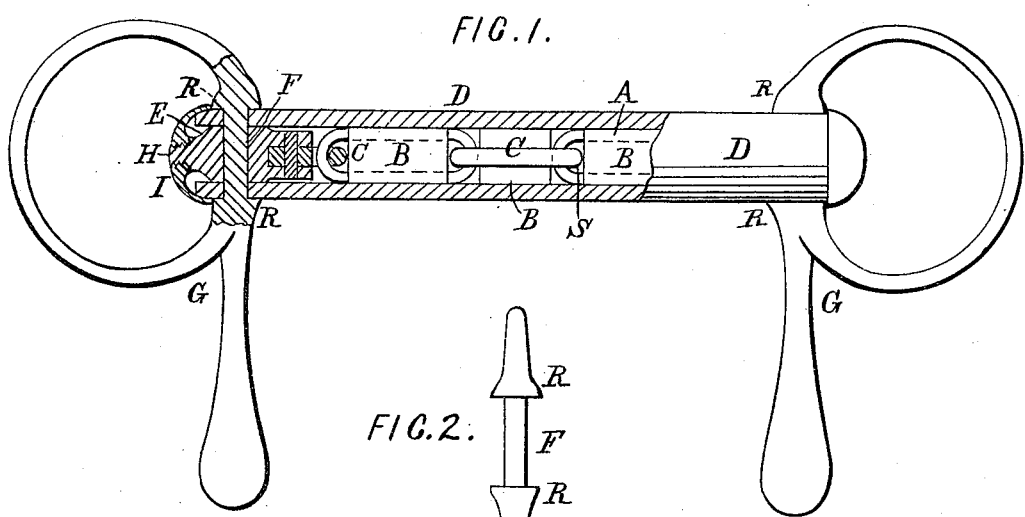
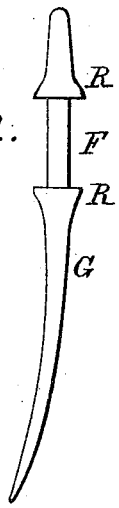
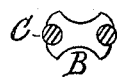
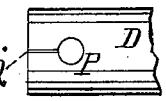
Witnesses:
W N Herrick
Thos S. Crane
Inventor:
Horace S. Squier
By Horace Harris
atty

United States Patent Office.

HORACE S. SQUIER, OF NEWARK, NEW JERSEY.

BRIDLE-BIT.

SPECIFICATION forming part of Letters Patent No. 248,620, dated October 25, 1881.

Application filed November 26, 1880. (Model.)

*To all whom it may concern:*

Be it known that I, HORACE S. SQUIER, of Newark, in the county of Essex and State of New Jersey, have invented a new and useful Improvement in Bridle-Bits, of which the following is a specification.

My invention relates to bridle-bits having a core to be covered with soft-rubber tubing; and it consists in the order of constructing a metallic flexible core, in the method of attaching the rubber tubing, and in the structure of the cheeks, giving increased strength, protection, and finish.

In the accompanying drawings, Figure 1 is a partially-sectional view of my improved bit. Figs. 2, 3, 4, and 5 are detached views of details.

In my construction of a flexible core (indicated by A) I cast a solid piece, B, as a base for a link, (it may be of any material,) having a groove on opposite sides, which is filled with a link, C, the ends extending out beyond the base and forming loops S, for connecting at right angle with the next link; or the loops may be cast on the ends of the base-pieces, and in malleable iron answer the same purpose. These several links form a round core to be covered with rubber tubing D.

The base-piece may be made oval in form or with recessed sides, as shown in Figs. 4 and 5, to be used, if preferred, in molding plastic rubber onto the core, which I may desire to do.

The end links of the core are united with a bulb and hook termination, E, made to receive the beam F of the cheeks G, said bulb having screw-shank H and cap I; or the bulb may be without the hook, having but an eye for the beam, which may be cast in it.

In attaching the tubing the ends of it are each fitted with the hole P and slit Q. The core is then made fast to one of the cheeks and bulbs, when the rubber is slipped onto the core, and the end being divided, as shown at Q, the beam is allowed to pass into the hole P, when the end is again closed and the cap I screwed on over the end of the rubber, as seen in Fig. 1, the rubber entering the cap. The rubber is now pressed down along the core until the bulb on the opposite end may be united to the core. Then the rubber is fitted around the beam, as at the other end, and the cap screwed on, completing the bit.

The cheeks G at the sections adjoining the beam have an enlargement, R, for the purpose of covering the hole P in the rubber and to give a broader shoulder, so it may have a firmer bearing and not wear the rubber by its contact. This enlargement I immediately lighten up to give the cheek a graceful appearance, as seen in Fig. 2. These features of rubber and bulb connection and enlargement may be used with either a stiff or flexible core, and with any form of cheek, full or half cheek.

I claim—

1. The flexible bridle-bit having the core made with the base-pieces B, united at right angles by the loops S, being adapted to bend freely in every direction, substantially as and for the purpose specified.

2. The flexible bit having the core made with the base-pieces B and links C, lying in grooves in the piece B and united at right angles to each other, being made to bend freely in every direction, substantially as set forth.

3. The core A, constructed substantially as described, in combination with the bulb E, having the screw-shank H and cap I, substantially as specified.

4. The rubber tubing having the holes P and slits Q, in combination with the core A, beam F, and cap I, substantially as and for the purpose set forth.

5. The cheeks G, having the enlargement R, in combination with a bit having a rubber covering, substantially as and for the purposes specified.

HORACE S. SQUIER.

Witnesses:
HORACE HARRIS,
N. C. BRISTOL.